United States Patent [19]
Nowak

[11] Patent Number: 5,669,665
[45] Date of Patent: Sep. 23, 1997

[54] CAR SEAT CUSHION

[75] Inventor: Ralph M. Nowak, Marblehead, Mass.

[73] Assignee: The First Years Inc., Avon, Mass.

[21] Appl. No.: 672,414

[22] Filed: Jun. 28, 1996

[51] Int. Cl.⁶ .................................................. A47C 7/38
[52] U.S. Cl. .................. 297/406; 5/922; 297/284.9; 297/397
[58] Field of Search ............. 297/219.1, 219.12, 297/284.9, 391, 397, 406, 464; 5/636, 637, 640, 922

[56] References Cited

U.S. PATENT DOCUMENTS

| | | | |
|---|---|---|---|
| 4,321,718 | 3/1982 | Chen | 5/640 X |
| 4,565,405 | 1/1986 | Mayer . | |
| 4,779,930 | 10/1988 | Rosen . | |
| 4,838,611 | 6/1989 | Talaugon . | |
| 5,149,173 | 9/1992 | Jay et al. | 297/284.9 |
| 5,163,195 | 11/1992 | Hill . | |
| 5,339,472 | 8/1994 | Yin . | |
| 5,383,711 | 1/1995 | Houghteling | 297/397 |
| 5,407,248 | 4/1995 | Jay et al. | 297/284.9 X |

FOREIGN PATENT DOCUMENTS 1173209  12/1969  United Kingdom ................. 297/284.9

Primary Examiner—Peter R. Brown
Attorney, Agent, or Firm—Fish & Richardson P.C.

[57] ABSTRACT

A child's safety seat cushion including a back, defining a head support region and a seat portion, and a pair of side supports projecting forward from each side of and in spaced-apart fixed relation to the head support region, wherein each side support includes an associated laterally adjustable ancillary support member which is adjustably connected to the side support and configured to cooperate with the side support. The ancillary support members adjustably connected to the side supports form an adjustable space therebetween for the head of a child with the ancillary support members are in spaced-apart relation.

9 Claims, 6 Drawing Sheets

CAR SEAT CUSHION

BACKGROUND OF THE INVENTION

This invention relates to a cushion for a child sitting in a child's safety seat used in an automobile, and in particular to a car seat cushion having a laterally adjustable support for the child's head.

It is desirable to laterally limit movement of a child's head when the child is seated in an automobile. When a child sleeps, unrestrained lateral head position may be uncomfortable to the child.

SUMMARY OF THE INVENTION

One general aspect of the invention is a car seat cushion including a back defining a head support region and a seat portion and a pair of side supports projecting forward from either side of and in spaced-apart fixed relation to the head support region; each side support includes an associated laterally adjustable ancillary support member which is coupled to the side support and is configured to cooperate with the side support, whereby the side supports coupled to the associated laterally adjustable ancillary support members form an adjustable space therebetween for a child's head.

In another general aspect of the invention, the laterally adjustable ancillary support members are in a spaced-apart relation.

An advantage of the present invention is that it supports the child's head when the child is seated in a car safety seat, through various stages of the child's development, by providing support members configured to be laterally adjustable.

Another advantage of the present invention is its ease of reconfiguration. There is no need to detach the side supports from the back, as might be necessary in cushions lacking lateral adjustability.

Preferred embodiments include the following features.

The back, side supports, and laterally adjustable ancillary support members are constructed from a foam material, such as foam rubber. The back and side supports are enclosed in a fabric cover having a zipper on a reverse side of the cover for easy removal of the back and side supports. The side supports are positioned in fixed relation to the back, such as by applying an adhesive to the front surface of the back and bonding the side supports to the front surface of the back in a head support region of the back.

Preferably, each side support includes a laterally adjustable ancillary support member hinged to the side support and adjustable between a first position projecting forward from the side support and a second position confronting the other laterally adjustable ancillary support member, wherein in each position each side support and associated ancillary support member hinged to the side support cooperate and form with the other side support and ancillary support member hinged thereto an adjustable space therebetween for the head of a child sitting in the car seat.

The adjustable space is smaller in the second position than in the first position.

In a preferred embodiment, attachment members made of hook and loop fasteners such as pads are disposed on the side supports and back and are used for selectively securing the ancillary supports to the side supports in the first position and the ancillary supports to the back in the second position, by means of hook and loop fastener straps attached to the laterally adjustable ancillary support members.

Other features and advantages of the invention will be apparent from the following detailed description, and from the claims.

DESCRIPTION OF THE PREFERRED EMBODIMENTS

Figure 1:
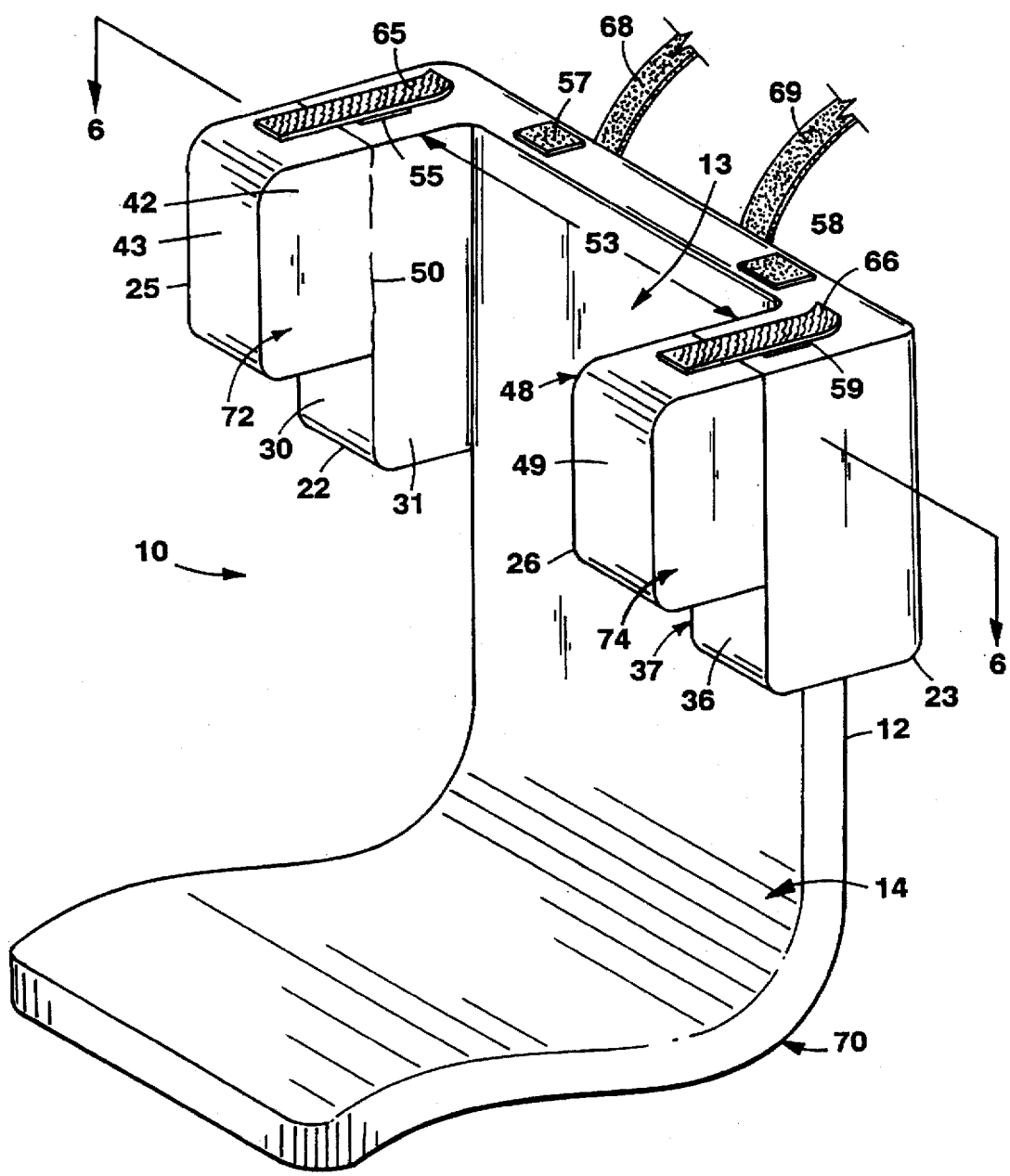
FIG. 1 is a perspective view of a child's safety seat cushion with the head support in a first configuration.
Figure 2:
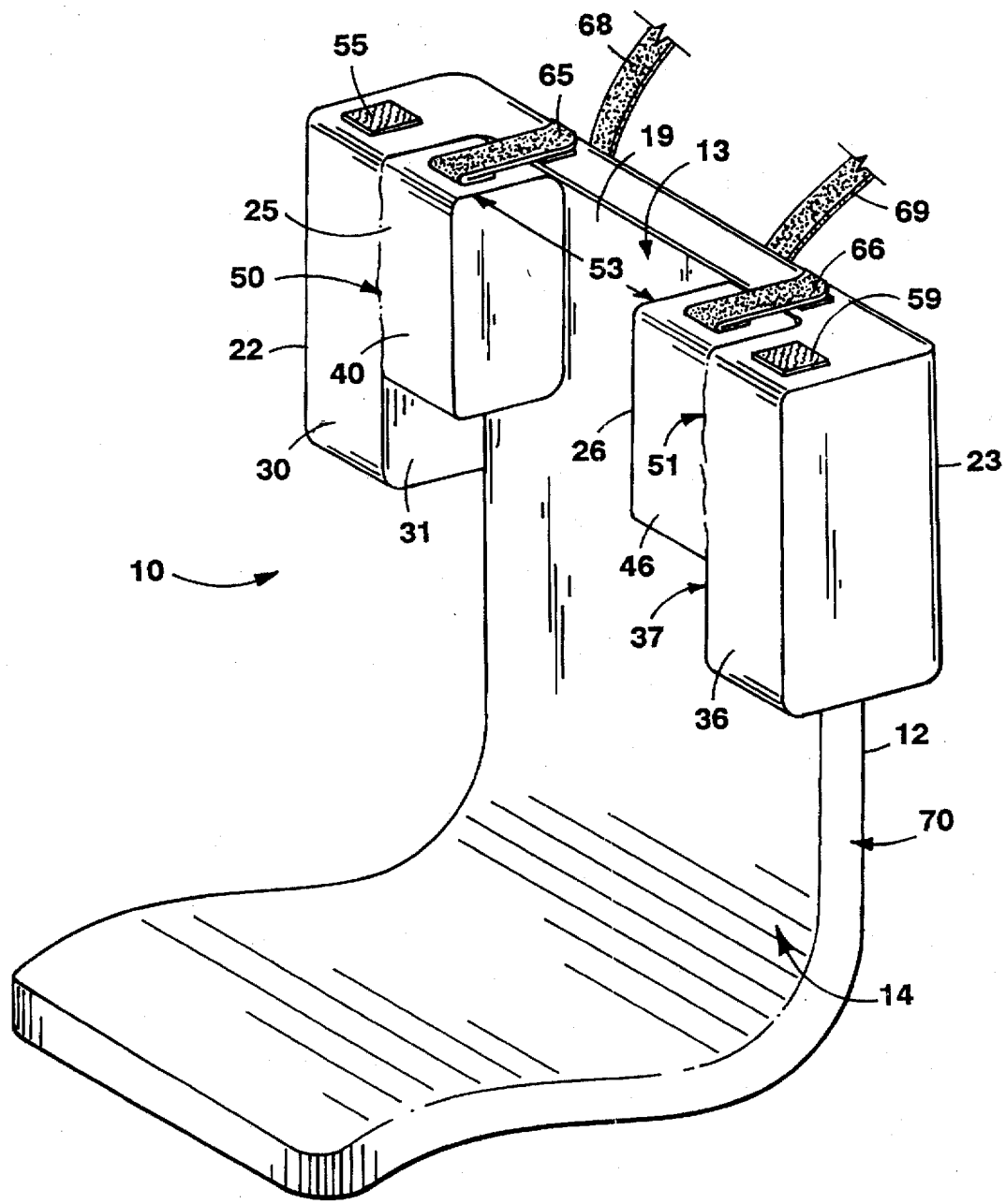
FIG. 2 shows the cushion of FIG. 1 with the head support in a second configuration.
Figure 6:
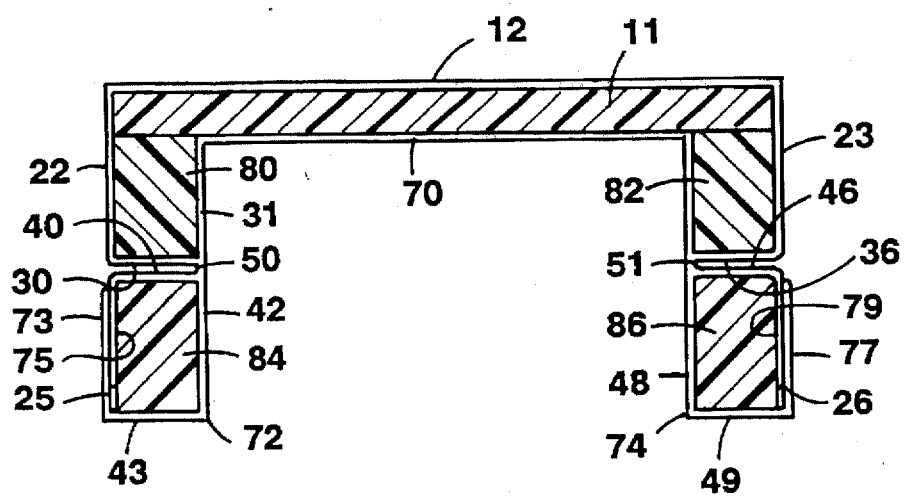
FIG. 6 is a reduced somewhat diagrammatic cross-sectional view of the head support region of the cushion taken along line 6—6 of FIG. 1.
Figure 7:
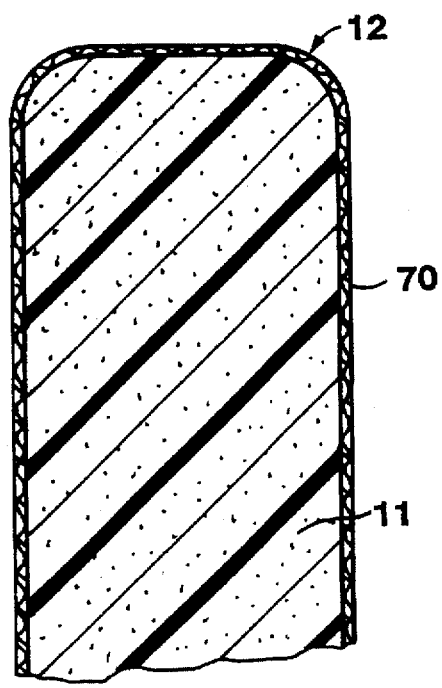
FIG. 7 is a cross-sectional view of the cushion taken along line 7—7 of FIG. 3.

Referring to FIGS. 1 and 2, the safety seat cushion 10, depicted in a first configuration, includes a back 12 having a head support region 13 and a seat region 14. As shown in FIGS. 6 and 7, the seat back 12 comprises a foam panel 11 enclosed in a fabric cover 70. Side supports 22, 23 are positioned at the head support region 13 and extend forwardly from the back 12. The side supports 22, 23, as shown in FIG. 6, comprise foam blocks 80 and 82 adhesively secured to the front of foam panel 11 forming the back support 12 and are enclosed with panel 11 in cover 70. Side supports 22, 23 include front surfaces 30, 36 and facing side surfaces 31, 37.

Laterally adjustable ancillary support members 25, 26, having back surfaces 40, 46 (best shown in FIGS. 2 and 6) and side surfaces 42, 48 (best shown in FIGS. 1 and 6), are about front surfaces 30, 36 of side supports 22, 23 in the first configuration. As shown in FIG. 6, ancillary support members 25, 26 comprise foam blocks 84 and 86 and covers 72 and 74. As shown in FIG. 6, covers 72, 74 on one side, the outer side as shown in FIG. 6, each have overlying fabric panels 73, 75 and 77, 79 which are open to form pockets for removably receiving foam blocks 84, 86. Seams 50, 51 of fabric cover 70 and fabric covers 72, 74 hingedly couple the auxiliary support members 25, 26 to the side supports 22, 23. The seams 50, 51 extend along the edges of the side supports 22, 23 at the junction of front surfaces 30, 36 and side surfaces 31, 37 and along the adjoining edges of the ancillary support members 25, 26 at the junction of back surfaces 40, 46 and side surfaces 42, 48 where they meet the edges of side surfaces 31, 37 of side supports 22, 23. The ancillary support members 25, 26 are not otherwise connected to side support 22, 23 and seams 50, 51 thus function as hinged connections.

Side supports 22, 23 and ancillary support members 25, 26 thus cooperate to form an adjustable space 53 therebetween for the head of a child. Ancillary support members 25, 26 are in a maximum spaced-apart relation in the first configuration illustrated in FIG. 1.

Referring to FIG. 2, the car seat cushion 10 is depicted in a second configuration. In the second configuration, ancillary support members 25, 26 are easily swung towards each other (i.e., inwards) such that facing surfaces 42, 48 of ancillary support members 25, 26 are positioned adjacent surfaces 31, 37 of side supports 22, 23. The front surfaces 43, 49 (see FIG. 1) of ancillary support members 25, 26 are placed adjacent front surface 19 of back 12. Side supports 22, 23 remain in fixed relation relative to back 12.

Adjustable space 53, depicted in FIG. 2, is smaller when cushion 10 is configured to be in the second configuration than when cushion 10 is configured to be in the first configuration (FIG. 1). The ancillary support members 25, 26 remain, however, in a spaced-apart relation in the second configuration.

Figure 3:
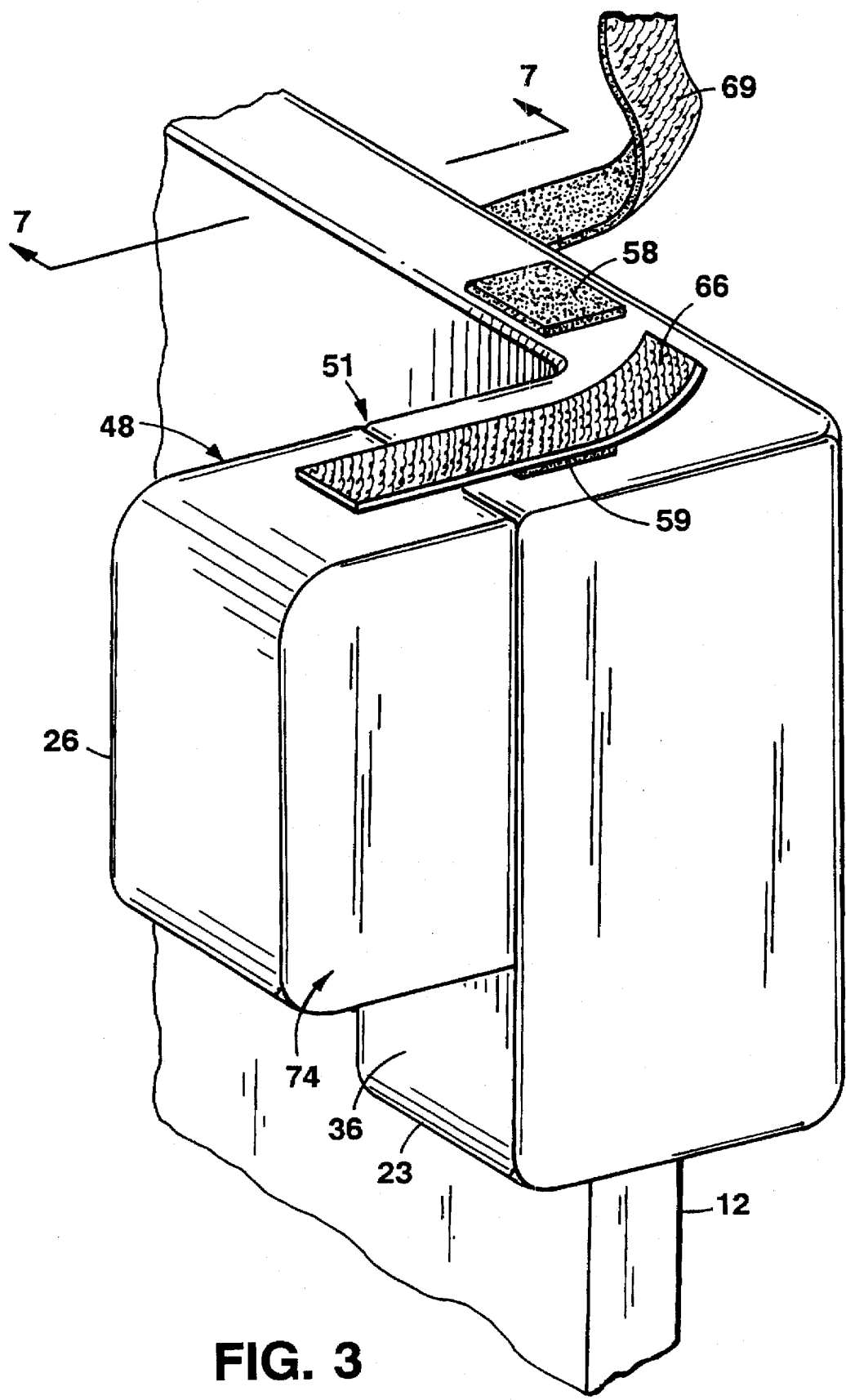
FIG. 3 is an enlarged fragmentary perspective view of the cushion shown in FIG. 1.
Figure 4:
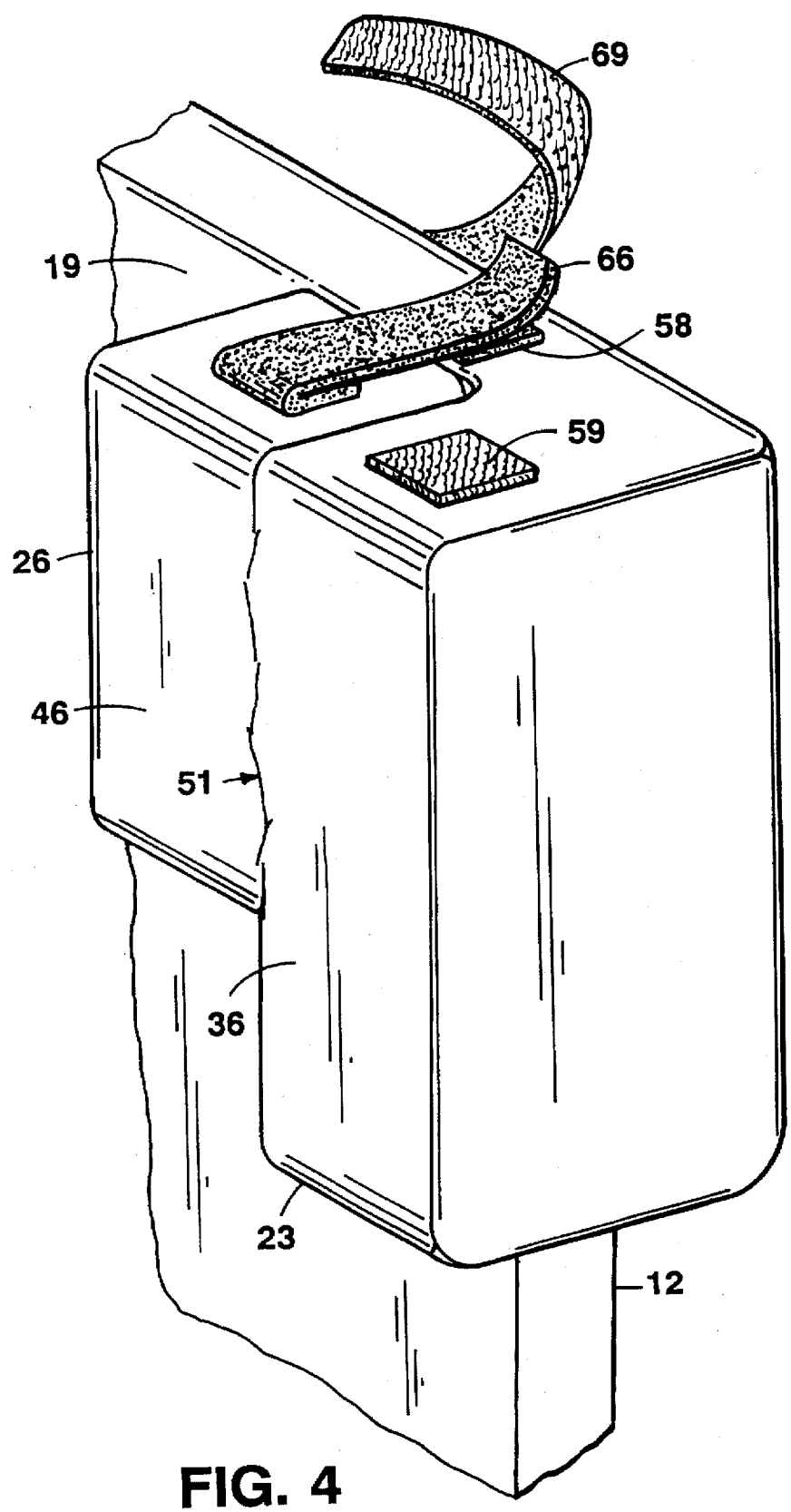
FIG. 4 is an enlarged fragmentary perspective view of the cushion shown in FIG. 2.

Attachment members 55, 57, 58, 59 and straps 65, 66 of hook and loop fabric adjustably secure the ancillary support members 25, 26 in their respective positions. Enlarged fragmentary perspective views of attachment members 58, 59 and strap 66 are illustrated in FIGS. 3 and 4. Members 55, 59 are hook members and are secured to the tops of side supports 22, 23; members 57, 58 are loop members and are secured at the top of back 12. Straps 65, 66 are double sided with hooks on one side and loops on the other side arranged to engage respectively members 55, 57, 58, 59 when ancillary support member 25, 26 are moved from one position to another.

Figure 5:
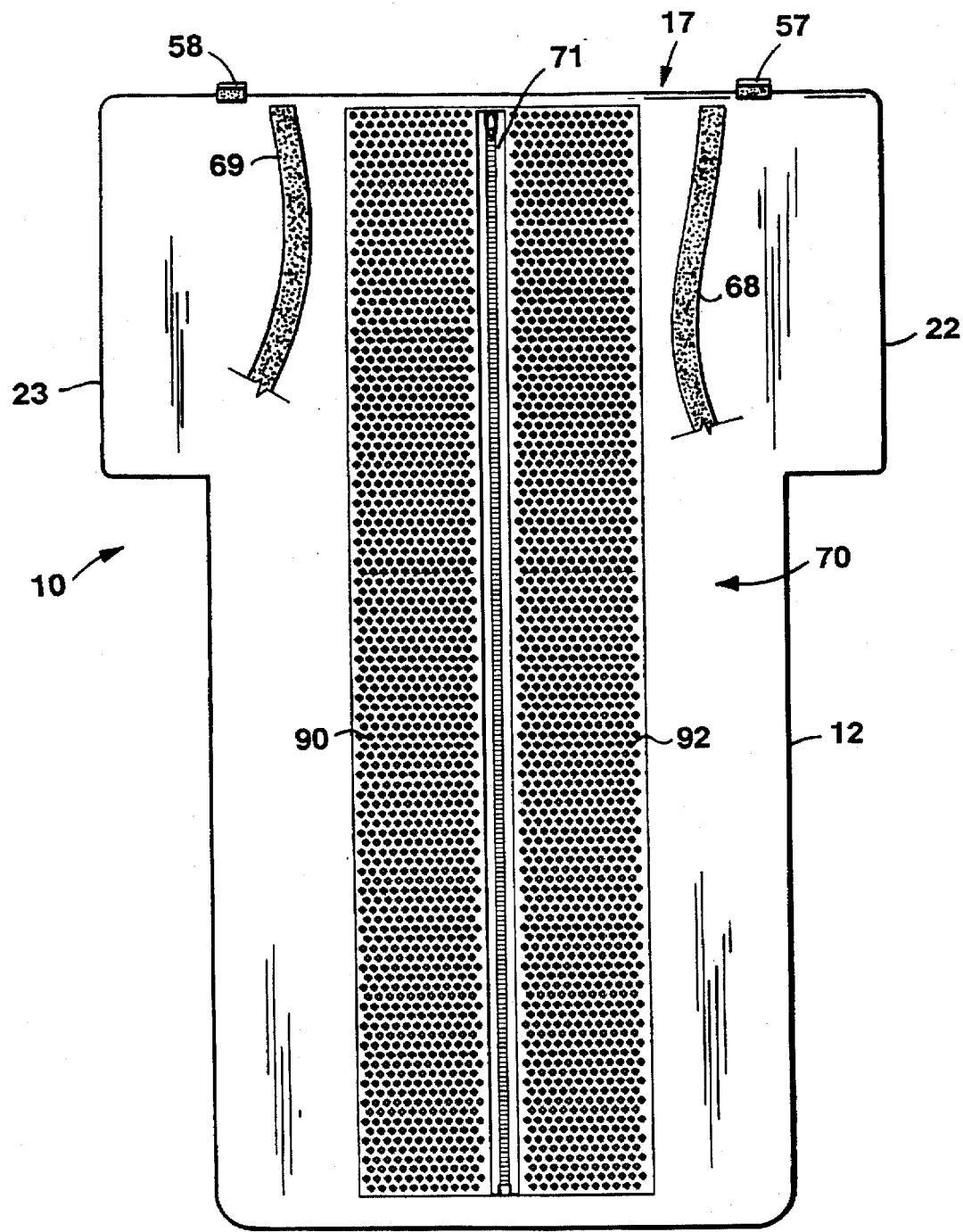
FIG. 5 is a rear view of the cushion shown in FIG. 1 and FIG. 2.

Referring to FIG. 5 which illustrates the rear of cushion 10, fabric cover 70, having a zipper 71 positioned adjacent the back surface 15 of back 12, removably encloses back 12 and side supports 22, 23. On either side of zipper 71, a portion of the cover 70 comprises panels 90, 92 of cotton twill fabric with PVC (polyvinyl chloride) dots on the exterior surface which reduce any tendency of the cushion to slide in a child's car seat. Attachment straps 68 and 69 of hook and loop fabric are attached near the top of the rear side back 12 to cover 70, the other ends of straps 69, 68 being free to overlie the seat of a car having fabric seat covers to further secure the cushion 10 in its position in a child's safety seat.

In use, the cushion is placed in a child's safety seat (not shown) which is conventionally placed on the seat of an automobile. If the automobile has fabric seat covers, straps 68, 69 are extended above the top of the child's car seat to engage the seat covers and to positively secure the car seat cushion in place. If the automobile has leather or plastic seat covers, straps 68, 69 may simply be rolled up and not used.

For an older child, the cushion may be used in the first configuration illustrated in FIG. 1. Straps 65, 66 engage attachment members 55, 59 to hold ancillary support members 25, 26 in their maximum spaced position. To narrow the space 53 between ancillary support members 25, 26, either for a smaller child or simply to maximize lateral head support, straps 65, 66 are disengaged from attachment members 55, 59 ancillary support members 25, 26 are rotated about the hinged connection of seams 50, 51, and straps 65, 66 are engaged to attachment members 57, 58 to form the configuration illustrated in FIG. 2.

To wash the cover 70 of the cushion and the attached covers 72, 74 of the ancillary support members 25, 26, foam blocks 84, 86 are removed from covers 72, 74 through the pockets formed by panels 73, 75, 77, 79. Zipper 71 is opened and the foam panel 11 and attached side supports 80, 82 are removed from cover 70 through the zippered opening. After the covers 70, 72, 74 have been washed the car seat cushion is reassembled by replacing the foam blocks and panel, 11, 80, 82, 84, 86 in covers 70, 72, 74.

Other embodiments are within the scope of the claims.

What is claimed is:

1. A car seat cushion, comprising
   a back defining a head support region and a seat portion;
   a side support projecting forward from each side of and in spaced-apart fixed relation to the head support region;
   a laterally adjustable ancillary support member adjustably connected to and configured to cooperate with each side support, said laterally adjustable ancillary support members being in spaced-apart relation,
   attachment members disposed on the ancillary support members, side supports, and back for selectively securing the ancillary support members to the side supports in a first position and to the back in a second position,
   whereby said laterally adjustable ancillary support members adjustably connected to said side supports form an adjustable space between said side supports for the head of a child sitting in the car seat cushion.

2. The cushion of claim 1 wherein each of the side supports and back comprise foam material.

3. The cushion of claim 2 wherein a cover encloses the side supports and back.

4. A car seat cushion, comprising
   a back defining a head support region and a seat portion;
   a side support projecting forward from each side of and in spaced-apart fixed relation to the head support region,
   each side support including a laterally adjustable ancillary support member hingedly connected to the side support and adjustable between a first position projecting forward from the side support and a second position beside the side support closer to the other ancillary support member,
   wherein in each position each side support and ancillary support member hingedly connected to the side support cooperate and form with the other side support and ancillary support member an adjustable space therebetween for the head of a child sitting in the car seat cushion, said laterally adjustable ancillary support members being in spaced-apart relation.

5. The cushion of claim 4 wherein each of the side supports and back support comprise foam material.

6. The cushion of claim 5 wherein a cover encloses the side supports and back.

7. The cushion of claim 6 further comprising attachment members disposed on the ancillary members, side supports, and back for selectively securing the ancillary supports to the side supports in the first position and to the back in the second position.

8. A laterally adjustable car seat cushion, comprising
   a back defining a head support region and a seat portion;
   a pair of side supports positioned in spaced-apart fixed relation to the head support region, the side supports having front surfaces and facing lateral surfaces;
   a cover enclosing the back and the side supports;
   a pair of laterally adjustable ancillary support members, each ancillary support member being connected to one of the pair of side supports, the laterally adjustable ancillary support members being enclosed by associated covers;
   the side supports and ancillary support members being connected by seams formed on the cover for the back and side supports and the covers for the ancillary support members which seams hingedly connect each ancillary support member to one of the side supports, the seams extending along facing edges of the side supports adjacent the intersection of the front surfaces and the facing lateral surfaces of the side supports, and the ancillary support members are thereby hingedly adjustable from a first position projecting forward from the front surfaces of the side supports and a second position beside the facing lateral surfaces of the side supports, wherein each associated side support and ancillary support member is structured to cooperate and form with the other side support and ancillary support member an adjustable space therebetween for the head of a child, the ancillary support members being configured to be in a spaced-apart relation in both the first and second positions thereof.

9. The cushion of claim 8 further comprising attachment members disposed on the side supports and back for selectively securing the ancillary support members to the associated side supports in a first position and to the back in a second position.

* * * * *